United States Patent [19]

Gawron, Jr. et al.

[11] 4,228,328

[45] Oct. 14, 1980

[54] SIGNAL DISTRIBUTOR TEST ARRANGEMENT

[75] Inventors: Louis Gawron, Jr., Reynoldsburg; Vincent H. Lindisch, Columbus; John P. Petrucci, Pataskala, all of Ohio

[73] Assignee: Western Electric Company, Inc., New York, N.Y.

[21] Appl. No.: 66,017

[22] Filed: Aug. 13, 1979

[51] Int. Cl.³ .............................................. H04M 3/26
[52] U.S. Cl. ................................ 179/175.2 R; 324/415
[58] Field of Search ..................... 324/28 R, 285 E; 179/175.2 R, 175.2 C, 175.23, 175.3 R, 175.2 D, 175.21

[56] References Cited

U.S. PATENT DOCUMENTS

| | | | |
|---|---|---|---|
| 3,919,504 | 11/1975 | Crosley et al. | 179/175.2 R |
| 4,035,592 | 7/1977 | Baudoin | 179/175.2 C |
| 4,076,970 | 2/1978 | Lubarsky, Jr. et al. | 179/175.2 R |

Primary Examiner—Thomas A. Robinson
Attorney, Agent, or Firm—Charles H. Davis

[57] ABSTRACT

An arrangement for testing relay contacts of a signal distributor is disclosed. The output relay contacts are coupled via isolation diodes to a common circuit node and the input relay contacts are coupled to a second node. A potential is applied to the first node through the diodes and contacts to a single scan point and selective operation of each distributor relay can be verified at the scan point. By reversing the nodes, the integrity of the diodes can be checked. Make, break, and transfer contacts are tested.

9 Claims, 2 Drawing Figures

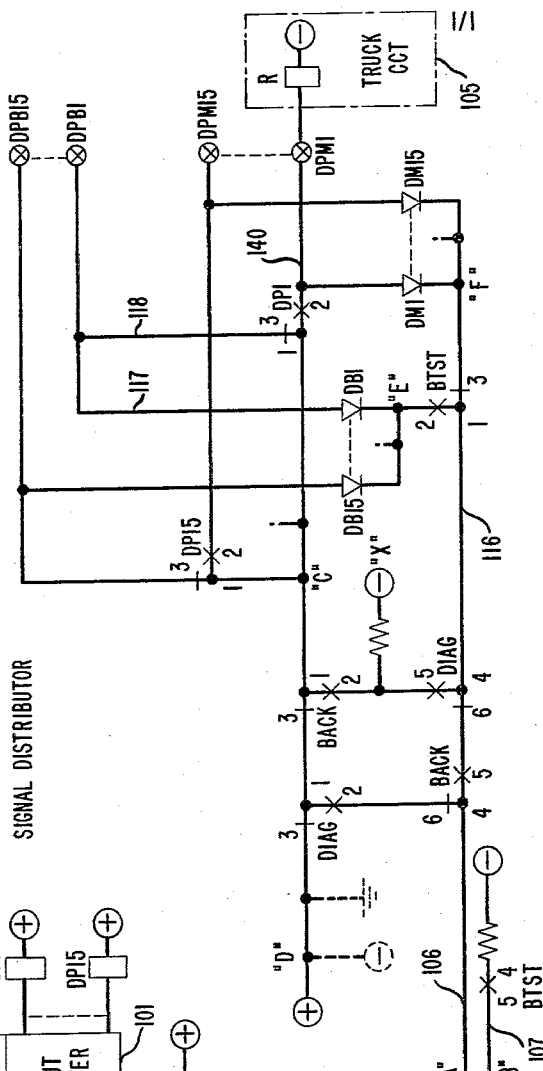
FIG. 1 SIGNAL DISTRIBUTOR
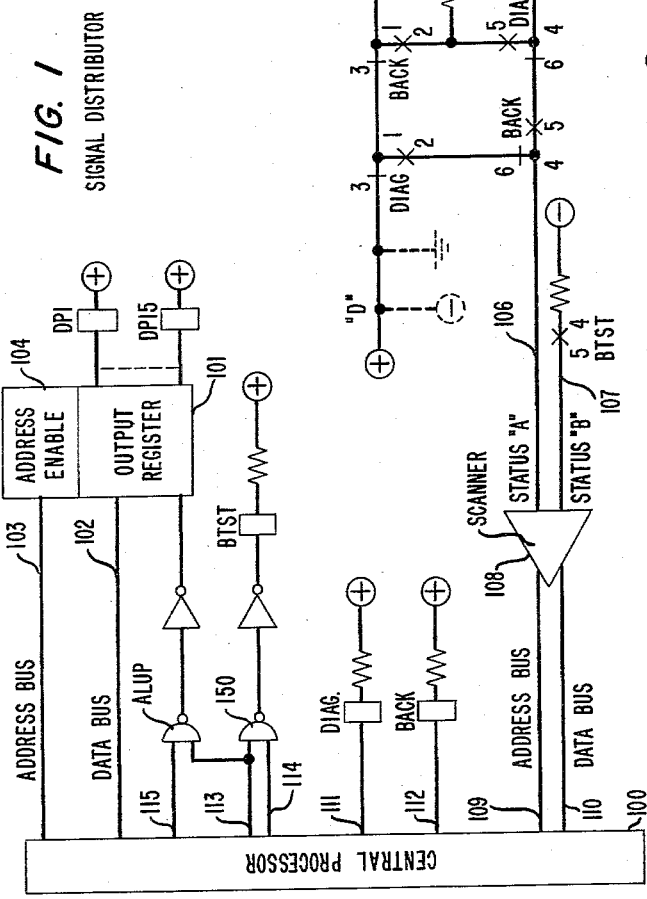
FIG. 2
| STATE | | 1 | 2 | 3 | 4 |
|---|---|---|---|---|---|
| RELAYS | DIAG. | OPR | REL | OPR | REL |
| | BACK | REL | OPR | REL | OPR |
| | BTST | REL | REL | OPR | OPR |
| CONN. SOURCE "X" TO | | "F" | "C" | "E" | "C" |
| CONN. "SCAN" TO | | "C" | "F" | "C" | "E" |
| TEST | | MAKE CONT. | DIODES DM- | BREAK CONT. | DIODES DB- |

SIGNAL DISTRIBUTOR TEST ARRANGEMENT

TECHNICAL FIELD

This invention relates to communication systems and particularly to arrangements for testing communication systems. In a particular aspect, this invention relates to arrangements for performing maintenance tests on a multiplicity of switches which execute the control orders of a central processing unit. In a more particular aspect, this invention relates to an arrangement for testing distribution points of a signal distributor used in a telephone switching system.

BACKGROUND ART

Signal distributors are generally used in telephone switching systems to interface high speed electronic central processing units with slower speed electromechanical circuitry. Typically, the signal distributors are connected to the central processor via a bus system, and a signal distributor is selected by the processor transmitting an address over an address bus. The processor then transmits data over a data bus to the signal distributor and the data is gated into the storage registers of the addressed signal distributor. The registers may comprise flip-flops which are set by the high speed pulses transmitted over the data bus. The flip-flops, in turn, may actuate magnetically latching relays and the signal distributor relays transmit DC potentials via distribution points to lines, trunks, and other miscellaneous circuits of the system.

It is desirable to test the signal distributor to verify that all distribution points are functioning properly. This has been accomplished in the prior art through the use of individual scan points associated with each distribution point. The central processor would perform a maintenance routine whereby it would actuate the individual distributor relays while scanning the scan points associated therewith to ascertain if each distribution point had been energized.

While this arrangement is wholly suitable for its intended purpose, it requires a multiplicity of scan points that are used only for test purposes.

DISCLOSURE OF THE INVENTION

The foregoing problem is solved and a technical advance is achieved by an arrangement for coupling the individual distribution points through isolation devices to a single scan point and selectively controlling the distributor to test each distribution point. More specifically, in the illustrative embodiment each distribution point is energized by a pair of contacts of a switching device such as a magnetically latching relay. The input contacts of all switches are coupled together to a first circuit node, while the output contacts of the switches are coupled together via isolation diodes to a second circuit node. In its first mode of operation, a potential is applied to the first node through the diodes in a low impedance direction and through the distributor contacts to a common scan point which is connected to the second circuit node and the selective actuation of each distributor relay is verified at the single scan point. In its second mode of operation, the circuit nodes are reversed and the operation of the distributor relay checks the integrity of the diodes in the high impedance direction via the same scan point. The circuitry is arranged to test "make", "break", and "transfer" type contacts of the switching devices in the signal distributor.

BRIEF DESCRIPTION OF THE DRAWING

FIG. 1 shows one illustrative embodiment of the invention in a signal distributor which can be used in a telephone switching system; and FIG. 2 depicts a state diagram of the test circuitry of the signal distributor.

DETAILED DESCRIPTION

The apparatus and operation of signal distributors are well-known in the prior art and are not part of this invention. A typical signal distributor is described in the *Bell System Technical Journal*, Vol. XLIII, September, 1964, beginning at page 2270.

The signal distributor shown in FIG. 1 comprises a plurality of signal distributor circuits each of which includes a switch, such as relays DP1–DP15. Relays DP1–DP15 are actuated by output register 101 which is enabled by binary information received over data bus 102 from central processor 100.

A telephone switching system may comprise a plurality of signal distributors such as the one shown in FIG. 1, and to select a particular one of the signal distributors, central processor 100 transmits the address of the signal distributor over address bus 103 to actuate the address enable circuit 104. When enabled, address enable circuit 104 will gate binary information from data bus 102 into output register 101 to selectively actuate the distributor switches, such as relays DP1–DP15.

When actuated, relays DP1–DP15 connect a potential from their respective inputs to output distribution points such as DPM1–DPM15 to actuate apparatus in the other circuits of the switching system. For example, positive potential from source D would be extended through break contacts 1 and 3 of relays DIAG and BACK to node C and then through make contacts 1 and 2 of relay DP1 and over conductor 140 to distribution point DPM1. Since relay R of truck circuit 105 is connected to this distribution point, relay R would be actuated whenever relay DP1 in the signal distributor is actuated.

It should also be noted that output distribution points DPB1–DPB15 are connected to the same potential source D via break contacts 1 and 3 of each of relays DP1–DP15. Thus, the actuation of a relay DP- will apply a potential to an output distribution point DPM- while the release of a relay DP- will apply the potential to an output distribution point DPB-. The potential applied at point D can either be positive, negative, or ground depending on the requirements of the system.

In accordance with a feature of the invention, the input side (contact 1) of each set of transfer contacts of relays DP1–DP15 is connected to a common circuit node C. The outputs of each contact set of relays DP1–DP15 are coupled through isolation diodes to other common circuit nodes. More specifically, the output make contacts 2 of relays DP1–DP15 are each connected through a corresponding diode DM1–DM15 to circuit node F, while the output break contacts 3 are each connected through a corresponding diode DB1–DB15 to circuit node E.

Central processor 100 can ascertain the status of the signal distributor by causing the distributor to assume various test states while examining the results through scanner 108. The details of scanner 108 form no part of the invention, but as is well-known in the prior art, the central processor addresses scanner 108 over address bus 109 and the condition of status A conductor 106 and status B conductor 107 is transmitted back over data bus 110 to central processor 100.

To test distributor switching relays DP1–DP15, central processor 100 goes through a sequence of operating states which will now be described. It is contemplated that central processor 100 is controlled by instructions stored in a program memory, but the sequence of operations that will be described below could also be performed by wired logic that is well-known in the art.

To begin the test and put the circuitry in its first test state, central processor 100 actuates relay DIAG by transmitting a signal over conductor 111. At its contacts 4 and 5 relay DIAG connects negative potential from source X over conductor 116 and through break contacts 1 and 3 of relay BTST to circuit node F. The negative potential is extended from circuit node F through each of diodes DM1–DM15 to contacts 2 of each of relays DP1–DP15.

Status A conductor 106, which is coupled to a scan point in scanner 108, is connected through break contacts 4 and 6 of relay BACK, through make contacts 1 and 2 of relay DIAG and through break contacts 3 and 1 of relay BACK to circuit node C. Circuit node C is connected to the input contact 1 of each of relays DP1–DP15.

Central processor 100 now addresses the signal distributor and transmits a plurality of data words over data bus 102. Each data word will operate a designated one of relays DP1–DP15, and as each relay is operated, its make contacts 1 and 2 are closed to connect the negative potential from source X over the previously traced path to circuit node F, through a corresponding DM- diode in the low impedance direction, through relay DP- contacts 1 and 2 and to the scan point associated with conductor 106. As each relay DP- is actuated, the operation of its make contacts is verified via a readout of the single scan point in scanner 108.

After each set of make contacts 1 and 2 of relays DP1–DP15 have been tested it is necessary to verify that none of the diodes DM1–DM15 are short circuited which would interfere with the operation of the distributor. For example, if diode DM15 were short circuited, each time a positive potential were applied from source D to actuate relay R via distribution point DPM1, this positive potential would also be extended through diode DM1 in the low impedance direction to circuit node F and through the defective diode DM15 to distribution point DPM15 thereby erroneously actuating the apparatus connected to both distribution points.

Thus, after testing each of the make contacts 1 and 2 of relays DP1–DP15, central processor 100 signals over conductor 112 to operate relay BACK and removes the signal from conductor 111 to release relay DIAG. With relay BACK operated and DIAG released, circuit node C is connected through contacts 1 and 2 of relay BACK to the negative potential at source X, and circuit node F is connected to the scanner via conductor 106.

Processor 100 also transmits signals over conductor 113 and 115 to enable gate ALUP and with gate ALUP enabled, output register 101 is set to operate all of the relays DP1–DP15. The circuit is now in its second state for testing the integrity of diodes DM1–DM15. With the negative potential from source X applied to the diodes in a high impedance direction, the scan point connected to node F will not be energized and the absence of this signal at scanner 108, informs processor 100 that none of the diodes DM- are short circuited.

The distributor can now be actuated to assume its third state whereby each of the break contacts 1 and 3 of relays DP1–DP15 are tested. This is accomplished by connecting nodes C and E to scanner 108 and source X, respectively, as set forth in the state diagram of FIG. 2.

Processor 100 removes the signal from conductors 115 and 112 at this time to release relay BACK. A signal is now transmitted over conductor 111 to reoperate relay DIAG. The processor also operates relay BTST by applying a signal to conductor 114, which, in conjunction with the signal conductor 113, enables gate 150 to operate the relay.

At its contacts 4 and 5 relay BTST energizes a scan point in scanner 108 to inform the processor that relay BTST has operated and the break contacts of the signal distributor can be tested.

At its contacts 1, 2, and 3, relay BTST disconnects circuit node F from conductor 116 and connects circuit node E to this conductor in preparation for testing the break contacts of relays DP1–DP15.

Processor 100 now transmits data words over data bus 102 to output register 101 to release each of the relays DP1–DP15. These relays are released one-at-a-time and as each relay is released, a circuit is completed for energizing the scan point connected to status A conductor 105. For example, negative potential from source X is connected through make contacts 4 and 5 of relay DIAG, over conductor 116, through make contacts 1 and 2 of relay BTST to circuit node E, through diode DB1 in the low impedance direction, over conductors 117 and 118 and through break contacts 1 and 3 of relay DP1 which is now released to circuit node C, through break contacts 1 and 3 of relay BACK, through make contacts 1 and 2 of relay DIAG, through break contacts 6 and 4 of relay BACK and then to scanner 108 via conductor 106.

After each set of break contacts 1 and 3 of relays DP1–DP15 have been tested, the test circuit must assume its fourth state to verify the integrity of the isolation diodes DB1–DB15 which couple the distribution points DPB1–DPB15 to circuit node E.

Diodes DB- couple the distribution points to a common test node E while maintaining electrical isolation between the distribution points DPB- similar to the functioning of diodes DM- with respect to distribution points DPM- as described above.

To verify the DB- diodes, processor 100 releases relay DIAG and operates relay BACK as previously described. Relay BTST is still operated at this time as set forth in the state diagram of FIG. 2. Processor 100 now communicates over data bus 102 to release all DP1–DP15 relays. With the DP- relays released, negative source X is connected to the anodes of diodes DB1–DB15. The cathodes of these diodes are connected to circuit node E which is connected through make contacts 1 and 2 of relay BTST, over conductor 116, and through break contacts 4 and 6 of relay DIAG and make contacts 4 and 5 of relay BACK to scanner 108. Since the potential is applied to the diodes in the high impedance direction, the scan point is not energized and the absence of a signal at scanner 108 informs processor 100 that none of the diodes DB- are short circuited.

Having completed the test of all make and break contacts and the continuity of diodes DB- and DMprocessor 100 can restore the signal distributor to normal.

Of course, it is to be understood that the arrangements described in the foregoing are merely illustrative of the application of the principles of the present invention and numerous other arrangements may be utilized by those skilled in the art without departing from the spirit and scope of the invention. For example, while the four states which the test circuitry assumes are described in a particular sequence, they may be performed in various other sequences within the teachings herein.

We claim:

1. For use in testing a plurality of distributor circuits of a signal distributor wherein each distributor circuit comprises an individual switch effective when enabled for interconnecting an energizing potential from an input to an output to energize a circuit coupled to the output
CHARACTERIZED BY
first means for coupling each said switch output to a first circuit node while electrically isolating each said output from all other outputs,
second means for coupling said switch inputs to a second circuit node,
a potential source,
a detector responsive to said source, and
circuit means effective when actuated in a first state for coupling said source and said detector to said first and second nodes, respectively, to ascertain the selective enablement of each said switch and effective when actuated in a second state for coupling said source and detector to said second and first nodes, respectively, to ascertain the continuity of said first coupling means.

2. The invention set forth in claim 1 wherein said first coupling means comprises a plurality of unidirectional current carrying devices each associated with a corresponding one of said outputs.

3. For use in testing a plurality of distributor circuits of a signal distributor wherein each distributor circuit comprises an individual switch effective when enabled for interconnecting an energizing potential on an input with a first output and effective when disabled for connecting said input with a second output, said outputs being connectable to circuits for energization thereof
CHARACTERIZED BY
a first plurality of diodes each coupling a corresponding one of said first outputs to a first switch circuit node,
means coupling said switch inputs to a second circuit node,
a second plurality of diodes each coupling a corresponding one of said second switch outputs to a third circuit node,
a potential source,
a detector responsive to said source, and
multistate circuit means being effective when actuated in a first state for coupling said source and detector to said first and second nodes, respectively, to ascertain the selective enablement of each switch; effective when actuated in a second state for coupling said source and detector to said second and first nodes, respectively, to ascertain the continuity of said first diodes; effective when actuated in a third state for coupling said source and detector to said third and second nodes, respectively, to ascertain the selective disablement of each said switch; and effective when actuated in a fourth state for coupling said source and detector to said second and third nodes, respectively, to ascertain continuity of said second diodes.

4. The invention set forth in claim 3 wherein said circuit means includes first and second relay means for controlling the coupling of said source, said detector, and said second node and said circuit means also includes third relay means for controlling the coupling of said first and third circuit nodes independently of said second node.

5. The invention set forth in claim 1 or 3 wherein said circuit means comprises means for enabling one at a time each said distributor switch when said circuit means is actuated in its first state and means for concurrently enabling all said distributor switches when said circuit means is in its second state.

6. The invention set forth in claim 1 or 3 wherein said circuit means comprises means effective when said circuit means is actuated in any said state for disconnecting said energizing potential from said inputs.

7. The invention set forth in claim 1 or 3 wherein said circuit means comprises first and second relays and means for operating said first relay during said first state and means for operating said second relay during said second state.

8. The invention set forth in claim 1 or 3 wherein said circuit means comprises a first relay having transfer contacts and a second relay having transfer contacts and wherein said transfer contacts are effective during each circuit state for interconnecting said nodes with said source and detector.

9. For use in testing a plurality of distributor circuits of a signal distributor wherein each circuit comprises an individual switch for interconnecting an input to an output for actuating a circuit connected to the output
CHARACTERIZED BY
a plurality of diodes each for connecting one of said outputs to a first circuit node,
means for coupling said inputs to a second circuit node,
a potential source,
a detector, and
first and second relay means for interconnecting said nodes to said source and detector, said first relay means comprising means effective when operated independently of said second relay means for connecting said source and said detector to said first and second nodes, respectively, whereby each said distributor switch extends said source through each said corresponding diode in a low impedance direction to enable said detector, and said second relay means comprising means effective when actuated independently of said first relay means for connecting said source and detector to said second and first node, respectively, whereby each said distributor switch connects said source to each said corresponding diode in a high impedance direction to block the enablement of said detector.

* * * * *